Sept. 8, 1970  B. J. GILLIGAN  3,527,496
TRAILER
Filed Nov. 1, 1968  4 Sheets-Sheet 1
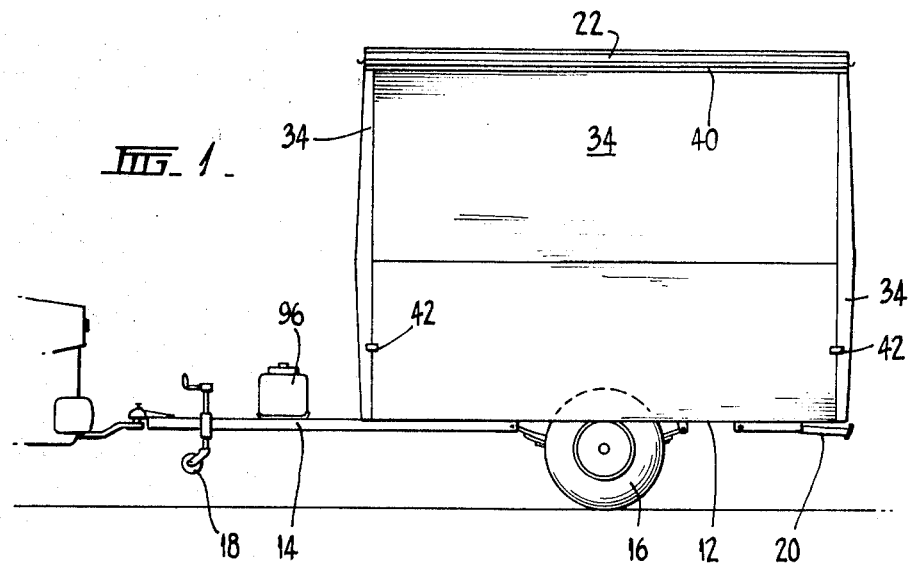
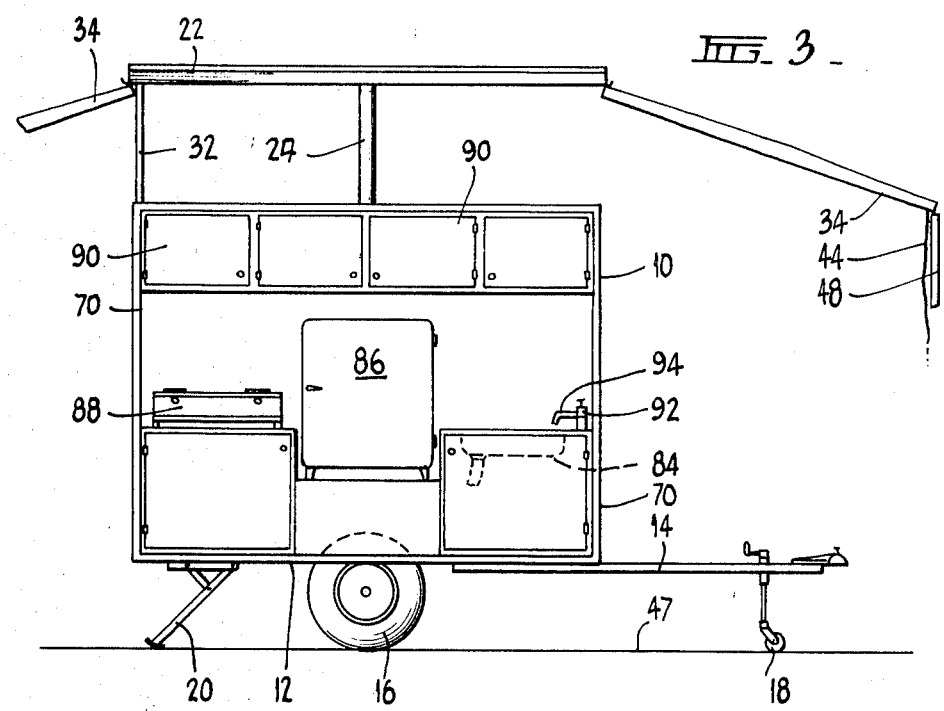

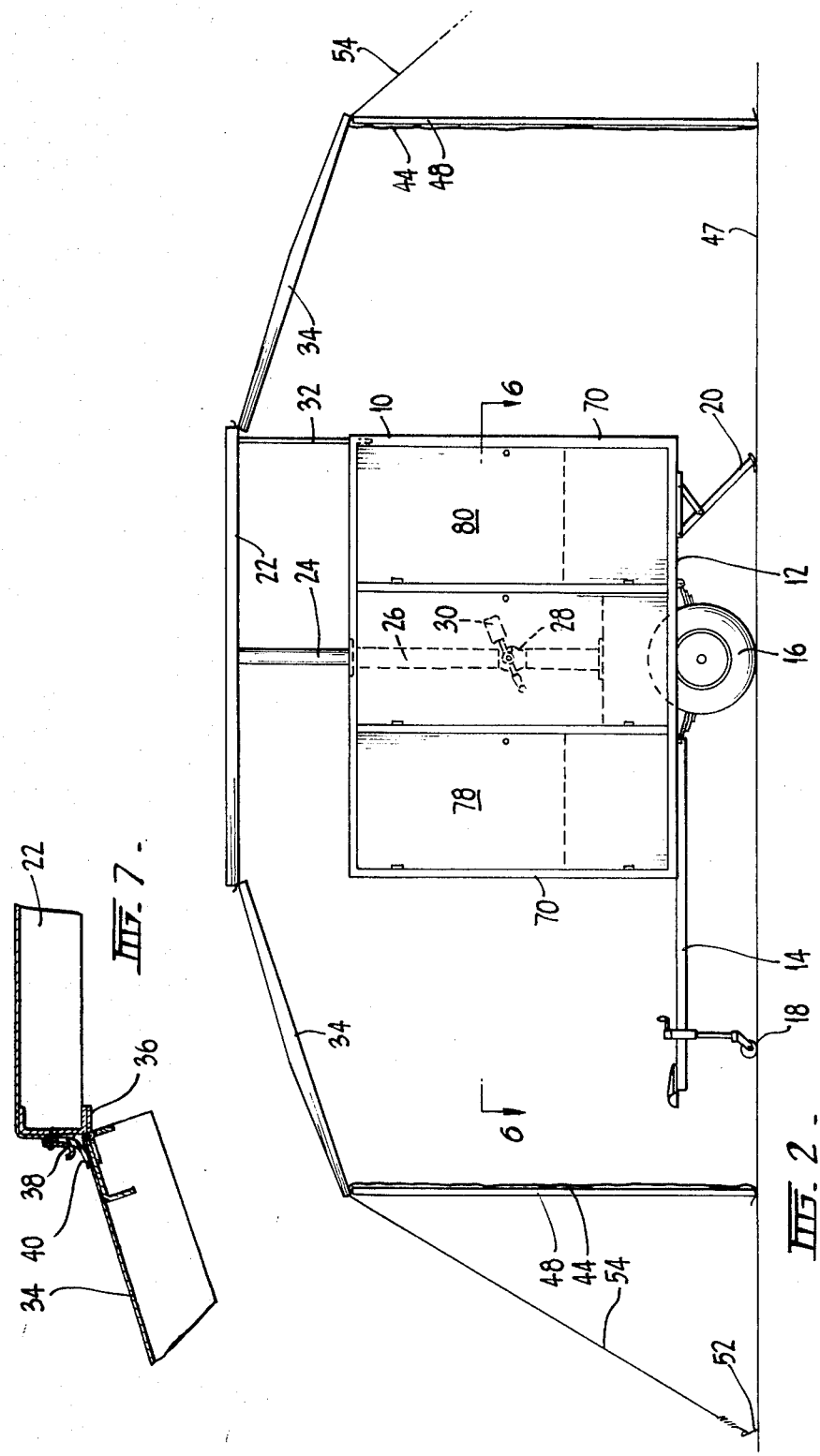

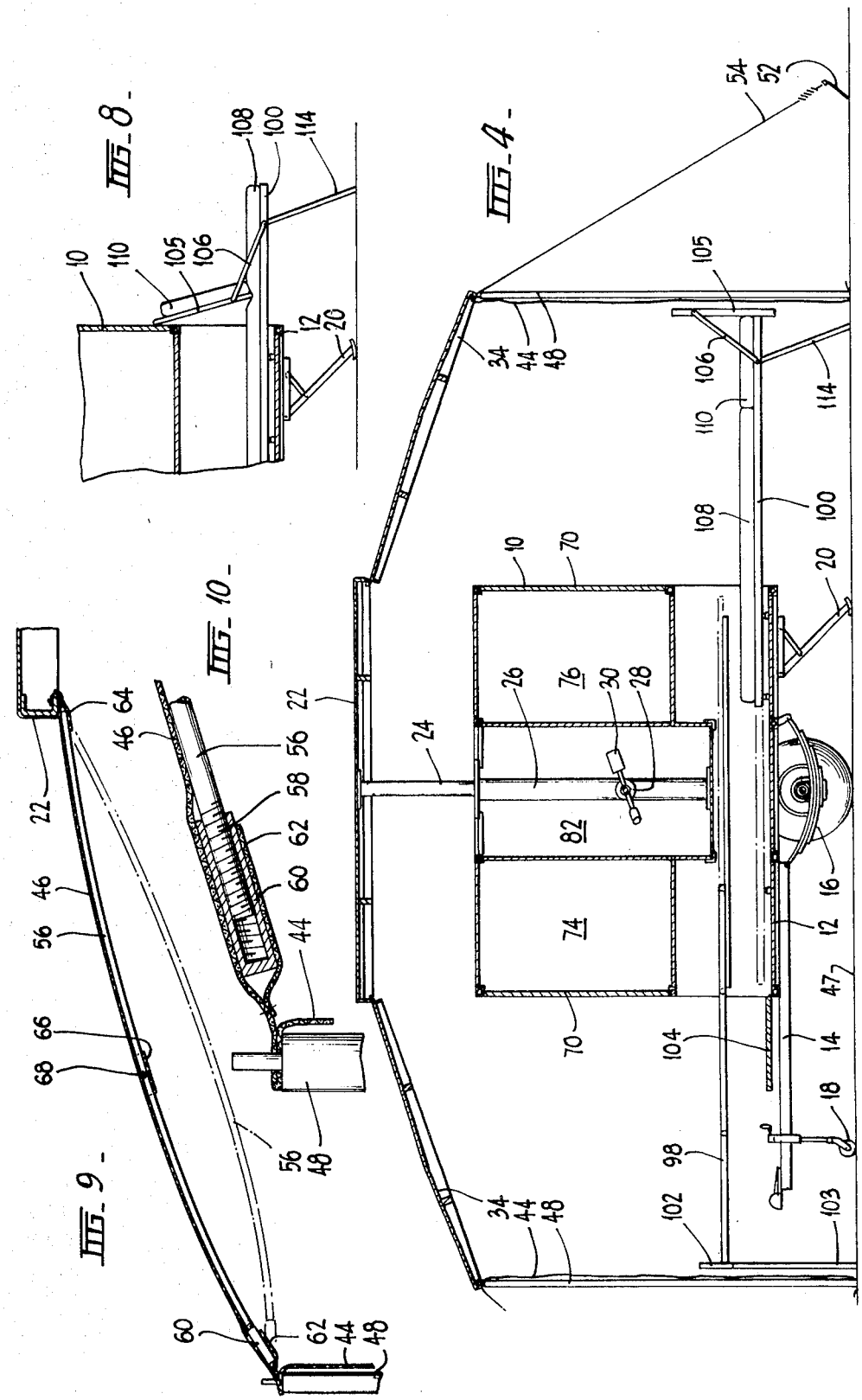

Sept. 8, 1970           B. J. GILLIGAN           3,527,496
TRAILER
Filed Nov. 1, 1968           4 Sheets-Sheet 4
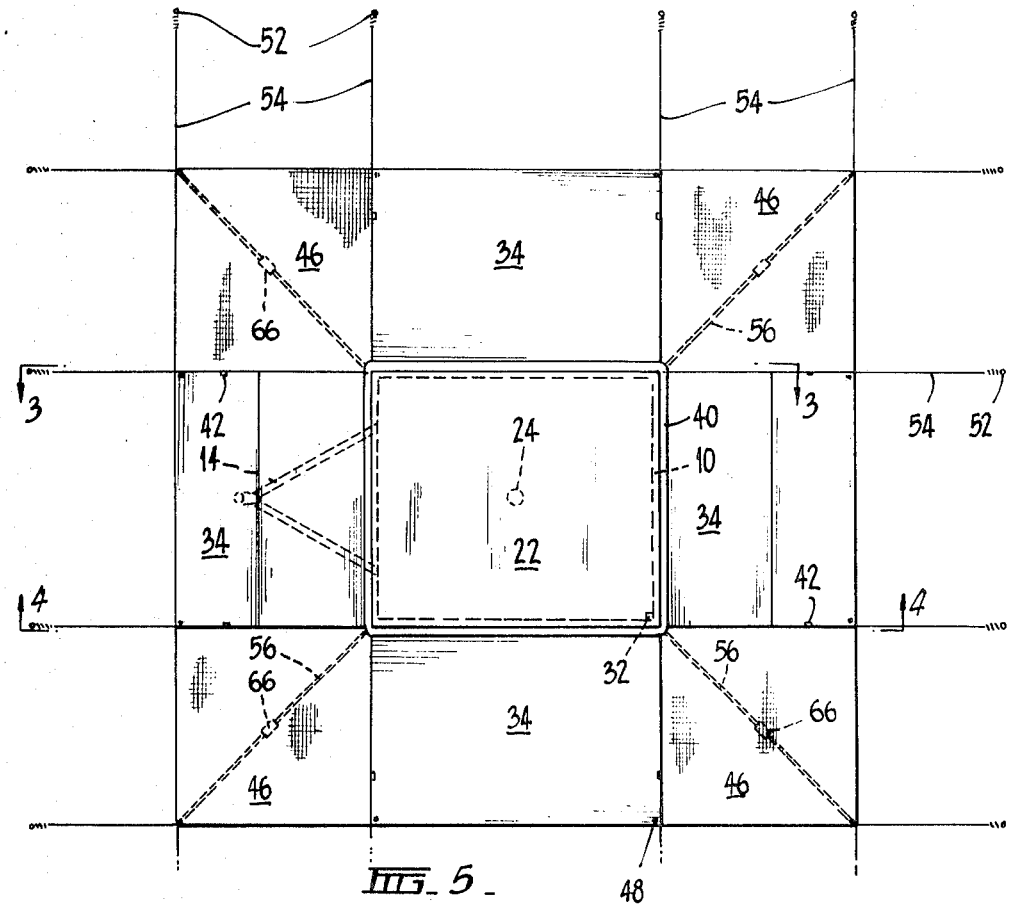
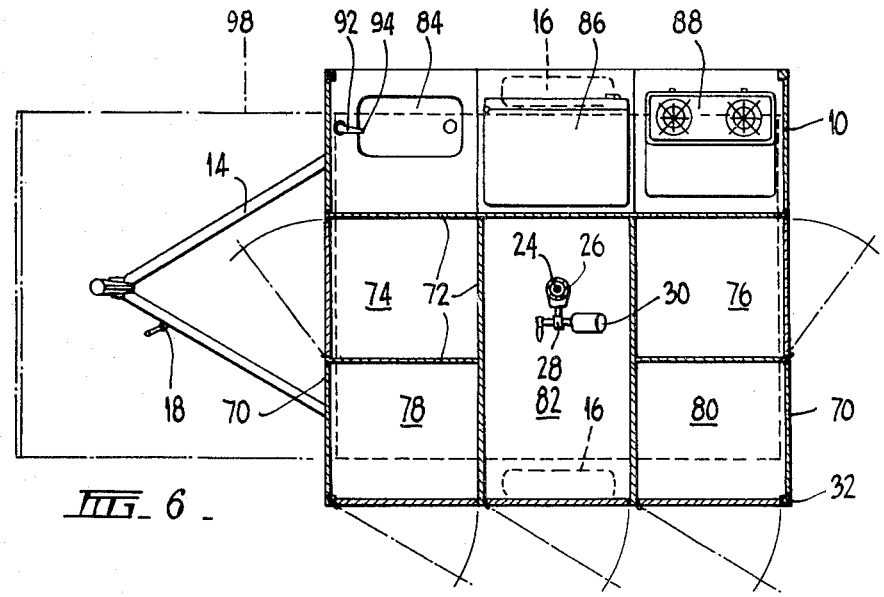

United States Patent Office 3,527,496
Patented Sept. 8, 1970

3,527,496
TRAILER
Brian James Gilligan, 24 Victoria St.,
Box Hill, Victoria, Australia
Filed Nov. 1, 1968, Ser. No. 772,623
Int. Cl. B60p *3/34*
U.S. Cl. 296—23                                9 Claims

ABSTRACT OF THE DISCLOSURE

A trailer having a rectangular roof mounted on a central post for vertical adjustment and having a flap pivoted to each roof edge and four foldable corner roof sections connected to each adjacent pair of said flaps.

---

This invention relates to a new and improved folding trailer and more particularly to a trailer of the type which, in what may be termed its collapsed condition, is relatively light and compact for transport by road and which, in what may be termed its erected condition, provides a relatively large tent or tent frame.

Most trailers as at present in use are relatively large, heavy and cumbersome. They place an undue strain on the towing vehicle, are more difficult to manoeuvre in traffic and, despite these disadvantages, provide limited and crowded accommodation when being used for the purpose for which they are designed.

It is therefore an object of this invention to provide an improved trailer which is light and compact, and at the same time is capable of providing a relatively large accommodation space when erected.

It is a further object of the invention to provide a folding trailer which is strongly constructed but light in weight and low in cost.

According to the invention there is provided a trailer comprising: a box-like frame structure; a roof section of generally rectangular configuration mounted on a central post by means of which it may be raised and lowered relative to said frame structure; a respective flap pivotally attached to each edge of said roof section, each of said flaps being rotatable between a position in which it extends outwardly to form a secondary roof section and a position in which it hangs downwardly; and a respective foldable corner roof section connected between adjacent edges of each adjacent pair of said flaps.

In order that the invention may be more readily understood it will now be described by way of example with reference to a particular embodiment illustrated in the accompanying drawings wherein:

FIG. 1 is a side view of a trailer according to the invention in its transport condition, FIG. 2 is a side view in cross section of a trailer according to the invention in its erected condition, FIG. 3 is a view similar to FIG. 2 taken on line 3—3 FIG. 5, FIG. 4 is a view similar to FIG. 2 taken on line 4—4 of FIG. 5, FIG. 5 is a plan view of the trailer of FIG. 2, FIG. 6 is a cross-sectional plan view taken on line 6—6 of FIG. 2, FIG. 7 is a fragmentary sectional view illustrating a typical connection between a flap and the roof section, FIG. 8 is a detail view illustrating the conversion of a bed to a divan, FIG. 9 is a fragmentary view illustrating the manner in which the corners of the roof are supported, and FIG. 10 is a fragmentary view illustrating the end construction of the roof support illustrated in FIG. 9.

The trailer illustrated in the drawings consists basically of a box-like frame structure 10 constructed chiefly from light section channel and tubular sections welded together.

In the particular example the sides parallel to the length of the trailer are approximately 6'6" long, the sides transverse to the length of the trailer are approximately 5'6" long, and the overall height of the trailer as seen in FIG. 1 is approximately 6'3", but it will be appreciated that other sizes may be used.

Frame structure 10 is mounted on a simple chassis 12 integral with a tow-bar 14. The chassis is provided with an axle on the outer ends of which are mounted a pair of wheels 16. The outer end of tow-bar 14 is provided with a retractable third wheel 18. The rear end of the trailer is provided with at least one, and preferably two, stabilizing jacks 20 for use when the trailer is in its erected condition.

Located above frame 10 is a roof section 22, preferably of sheet metal (aluminium or steel) construction, on a channel frame and supported on a central post 24 which slides vertically in a tube 26 centrally located in frame 10. In some cases the roof section 22 may be constructed of suitable plastics material. Post 24 may be raised and lowered by means of a hoist 28 which in this case is of a mechanical type but may, if so desired, be hydraulic. The crank handle used to operate hoist 28 is provided with a counter weight 30 to make the hoist substantially self-locking.

To prevent rotation of roof section 22 relative to frame 10, a stabilizer 32, which may be in the form of a square tube, extends downwardly from one corner of roof section 22 into a hollow upright corner member of frame 10. Alternatively, but preferably additionally, a key may be attached to the external surface of post 24 for engagement with a keyway in tube 26.

As seen in plan view, roof section 22 has dimensions slightly greater than the corresponding dimensions of frame 10 and to each of its edges a respective flap 34, preferably constructed from sheet metal on a channel frame, is attached by means of a hinge 36 as best seen in FIG. 7. A gutter 38 surrounds roof section 22 and from between the gutter and the side of the roof section a rubber flashing strip 40 extends downwardly to prevent rain water entering through hinge 36. In some forms of the invention the flaps 34 may comprise a metal frame covered with canvas or other suitable flexible material.

In the transport condition of the trailer as illustrated in FIG. 1, the roof section 22 sits on top of frame 10 and the flaps 34 hang vertically downwards. The flaps are held in position by four clips 42 which connect the front and rear flaps to the side flaps. When the trailer is in its erected condition, the roof section 22 is raised a suitable distance above frame 10 by means of hoist 28 and flaps 34 extend outwardly and downwardly to form secondary roof sections. Wall sections 44 are hung from the outer edges of flaps 34, corner roof sections 46 are connected to the side edges of adjacent flaps 34 and further wall sections 44 are connected to the outer edges of the corner roof sections.

The corner roof sections and the walls are preferably made from canvas or other flexible material and, in the transport condition of the trailer as illustrated in FIG. 1, these are hung by means of hooks or the like from the underside of roof section 22 and are enclosed within the flaps 34. Thus in its transport condition the trailer is very compact and presents a neat external appearance.

The trailer is erected to form a tent by proceeding according to the following sequence of steps:

A floor 47 of rot-proofed canvas or other suitable material is provided and marks are made on this to indicate the most convenient position of the wheels of the trailer. The floor 47 is spread out on a convenient tract of reasonably flat ground, and the trailer is rolled onto it and placed with its wheels on the marks referred to above. Jacks 20 and third wheel 18 are lowered to give the trailer firm support. The clips 42 are then released and the flaps 34 are raised one at a time and supported by means of tent poles 48.

The walls 44 and corner roof sections 46 are then released from their hooks and allowed to hang downwardly. The hoist 28 is operated to raise the roof to the position indicated in FIG. 2 and further tent poles are placed at the corners. Tent pegs 52 are driven into the ground at appropriate locations and are connected to the tent poles by means of guy ropes 54. The lower edges of the walls 44 are held down by further tent pegs (not shown).

It has been found with the construction described that there is some difficulty in achieving a neat appearance in the corner roof sections due to the fact that they are not normally stretched to remove wrinkles. This difficulty is overcome by the provision of corner stretchers 56 best seen in FIGS. 9 and 10. Each stretcher consists of a bowed length of round spring steel. Preferably one end of the stretcher is threaded as indicated at 58 in FIG. 10 and has screwed onto it a tubular sleeve 60 to enable its effective length to be adjusted. A pocket 62 of canvas or other suitable material is sewn to the underside of each roof section adjacent its corner tent pole and a further pocket 64 is provided adjacent the corner of the roof section 22. The pockets are so arranged that their open ends face towards each other.

The stretcher 56 has its ends placed in the pockets 62, 64 with its central section hanging downwardly as indicated in dotted lines in FIG. 9. The stretcher 56 is then rotated about its ends to the position indicated in full lines in FIG. 9 in which it supports and stretches the respective corner roof section. The stretcher 56 is held in this position by means of a flap 66 sewn to the underside of the corner roof section. Flap 66 passes around the stretcher and has its free end secured to the underside of the corner roof section by means of a catch 68.

The interior of frame structure 10 is fitted out to provide storage space and a working area, and to this end is side of the corner roof section. Flap 66 passes around 70 are preferably of sheet metal and the internal partitions 72 are preferably of plywood or the like.

The storage space includes central, front and rear compartments 74, 76 which may be used for general storage, front and rear corner storage compartments 78, 80 on the left side of the trailer preferably fitted out as wardrobes with hanging space in the upper sections and shelves or drawers for smaller items in the lower sections, and a storage space 82 extending between compartments 74, 78 on one side and compartments 76, 80 on the other side and opening to the left of the trailer. Compartment 82 may be used for general storage and provides access to the handle of hoist 28.

The right hand side of the space within frame 10 is fitted out as a kitchen as best seen in FIGS. 3 and 6. This area is fitted with a sink 84, a refrigerator 86 and a gas stove 88, above which a set of cupboards 90 is mounted. A water tank is fitted below sink 84 and is connected to a pump 92 by means of which water may be delivered to sink 84 through outlet 94.

A gas cylinder 96 to supply gas stove 88 and refrigerator 86 is carried on tow-bar 14 for transport purposes (see FIG. 1) but is removed and placed outside, for the reason set out hereunder, when the trailer is expanded for use as a tent.

The space beneath the storage sections above-described is left clear to accommodate two beds 98, 100 which are best illustrated in FIGS. 4 and 8. One bed 98 is illustrated in FIG. 6 in the position it occupies when withdrawn from its storage space inside frame 10. It will be clear that bed 98 could not be fully withdrawn if gas cylinder 96 was still in position on tow-bar 14.

Bed 98 is provided with a head 102 of tubular square section metal and with a pair of removable legs 103 made of the same material as the head 102 with square projections at their upper ends to fit neatly into the tube of the head. When legs 103 are not required to support the end of bed 98, they may be easily removed and placed on top of the bed.

A front panel 104 hinged at its lower edge to frame 10 may be dropped to the position indicated in FIG. 4 to permit bed 98 to be withdrawn, and is returned to the vertical position to close the front of the storage section after bed 98 has been returned to its storage position within frame 10. A suitable catch holds panel 104 in its closed position.

Bed 100 is provided with a headboard 105 which forms part of the rear well of the enclosure within frame 10 when bed 100 is in its transport position.

The head of bed 98 is fixed, while the head of bed 100 is mounted on a pair of links 106 having their respective ends pivotally attached to the bed and to the headboard 105. The mattress of bed 100 is made in two parts 108 and 110 to enable the bed to be converted into a sofa or the like for use when the bed is not required for sleeping. This conversion is illustrated in FIG. 8, the steps required to effect the alteration from the bed illustrated in FIG. 4 to the sofa illustrated in FIG. 8 being as follows:

Firstly, mattress section 110 is removed and mattress section 108 is moved to the right as illustrated in FIG. 4 until it contacts the headboard 105. The headboard is raised and rotated on its links 106 to the position illustrated in FIG. 8. The bed is then pushed into frame 10 until the upper edge of headboard 105 rests against the end wall of the storage enclosure as illustrated in FIG. 8. Previously removed mattress section 110 is then lent against headboard 105 to complete the sofa. Reconversion to the form of a bed is merely the reverse of the above procedure.

Beds 98, 100 are supported one above the other within frame 10 by means of nylon rollers. Bed 98 is provided with removable legs 103, as indicated above, and bed 100 is provided with foldable legs 114 to support its outer end when it is being used as a bed.

From the above description, it will be clear that the invention provides a trailer which is light and compact for towing, and which can be easily and quickly expanded to form a spacious tent-like enclosure when required for living accommodation.

The kitchen facilities are readily accessible during short stopovers simply by raising flap 34 on the left-hand side of the trailer and supporting it on one or two tent poles.

If so desired, the accommodation can be still further expanded by raising one or more of the wall sections 44 to an approximately horizontal position, supporting its outer end on tent poles, and hanging further wall sections from it.

What is claimed is:

1. A trailer comprising: a box-like frame structure; a roof section of generally rectangular configuration mounted on a central post by means of which it may be raised and lowered relative to said frame structure; a respective flap pivotally attached to each edge of said roof section, each of said flaps being rotatable between a position in which it extends outwardly to form a secondary roof section and a position in which it hangs downwardly; and a respective foldable corner roof section connected between adjacent edges of each adjacent pair of said flaps.

2. A trailer according to claim 1 including means to prevent rotation of said roof section about the axis of said central post.

3. A trailer according to claim 1 including a hoist operable to raise said central post and with it the roof section.

4. A trailer as claimed in claim 1 wherein said roof section and said secondary roof sections are of sheet metal construction and said corner roof sections are constructed of flexible fabric.

5. A trailer according to claim 2 wherein each of said corner roof sections is approximately rectangular and has its outermost corner supported by a tent pole, and wherein each of said corner roof sections is supported between its outermost corner and the diagonally opposite corner by means of a bowed rod, the ends of which are held adjacent the underside of the corner roof section and the central portion of which is held to the underside of the corner roof section in such manner as to prevent it rotating about its ends.

6. A trailer as claimed in claim 1 including flexible fabric wall members connected to the outer edges of said roof sections.

7. A trailer according to claim 1 wherein said box-like frame structure is divided by partitions into storage compartments and an area fitted with kitchen equipment.

8. A trailer according to claim 7 including two beds slidably mounted, one above the other, within said box-like frame structure and arranged to slide out of said box-like frame structure in opposite directions.

9. A trailer according to claim 8 wherein one of said beds is provided with a headboard mounted on pivoted links whereby it may be rotated to a position in which it forms a backrest for a soft, and wherein the bed is provided with a mattress constructed in two sections to enable at least part of one section to form a seat pad for said sofa and the other section to be used as a backrest pad for said sofa.

References Cited

UNITED STATES PATENTS

| | | | |
|---|---|---|---|
| 3,213,868 | 10/1965 | Forbes | 52—66 |
| 3,359,693 | 12/1967 | Mitas | 296—23 |

PHILIP GOODMAN, Primary Examiner

U.S. Cl. X.R.

296—26; 52—66